(12) United States Patent
Charriere et al.

(10) Patent No.: US 7,613,476 B2
(45) Date of Patent: Nov. 3, 2009

(54) METHOD AND APPARATUS FOR PATH IMBALANCE REDUCTION IN NETWORKS USING HIGH SPEED DATA PACKET ACCESS (HSDPA)

(75) Inventors: Patrick Charriere, West Challow (GB); Seau-Sian Lim, Swindon (GB); Jens Mueckenheim, Nuremberg (DE); Philip Sapiano, Corsham (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 579 days.

(21) Appl. No.: 11/446,084

(22) Filed: Jun. 2, 2006

(65) Prior Publication Data

US 2007/0281728 A1    Dec. 6, 2007

(51) Int. Cl.
*H04Q 7/20* (2006.01)
(52) U.S. Cl. .................. 455/522; 455/69; 455/127.1; 455/67.11; 455/436; 455/500; 370/331; 370/332; 370/328; 370/329
(58) Field of Classification Search ............... 455/522, 455/69, 127.1, 500, 517, 67.11, 436–444, 455/422.1, 403, 550.1, 432.1, 561, 560, 412.1, 455/412.2, 423–425, 67.13, 67.14; 370/331, 370/332, 334, 328, 329
See application file for complete search history.

(56) References Cited

U.S. PATENT DOCUMENTS

| 5,675,581 | A | 10/1997 | Soliman |
| 6,876,868 | B2 * | 4/2005 | Crocker et al. ............... 455/522 |
| 7,054,288 | B2 | 5/2006 | Sternberg et al. |
| 7,054,633 | B2 | 5/2006 | Seo et al. |
| 2002/0172208 | A1 | 11/2002 | Malkamaki |
| 2003/0013443 | A1 | 1/2003 | Willars et al. |
| 2003/0099249 | A1 | 5/2003 | Heijenk |

(Continued)

FOREIGN PATENT DOCUMENTS

EP    1 494 366    1/2005

(Continued)

OTHER PUBLICATIONS

PCT International Search Report corresponding to PCT Patent Application PCT/US2007/012532 filed Feb. 25, 2007 (5 pages).

(Continued)

*Primary Examiner*—Keith T Ferguson
(74) *Attorney, Agent, or Firm*—Harness, Dickey & Pierce, P.L.C.

(57) ABSTRACT

A method and apparatus are disclosed whereby noise is introduced at one or more base stations in non-HSDPA cells into the uplink signal from one or more user devices. As a result, the apparent quality of the uplink channel in those cells will appear to be lower than the actual quality of that channel. The power control commands issued from the base station to the user device will, therefore, reflect this lower estimated channel quality and, as a result, the user device will follow power control commands from the base station in the HSDPA cell. Therefore, the transmit power of the user device will remain adequate to communicate with the base station in the HSDPA cell and, as a result, the UL and DL in the HSDPA cell will remain synchronized.

30 Claims, 7 Drawing Sheets

U.S. PATENT DOCUMENTS

| | | |
|---|---|---|
| 2003/0099255 A1 | 5/2003 | Kekki et al. |
| 2003/0147370 A1 | 8/2003 | Wu |
| 2003/0189918 A1 | 10/2003 | Das et al. |
| 2003/0192003 A1 | 10/2003 | Das et al. |
| 2003/0192004 A1 | 10/2003 | Gopalakrishnan |
| 2003/0210668 A1 | 11/2003 | Malladi et al. |
| 2003/0214922 A1 | 11/2003 | Shahrier |
| 2004/0077368 A1 | 4/2004 | Anderson |
| 2004/0106423 A1* | 6/2004 | McGowan et al. .......... 455/522 |
| 2004/0243903 A1 | 12/2004 | Pan et al. |
| 2005/0066260 A1 | 3/2005 | Natori |
| 2005/0078648 A1 | 4/2005 | Nilsson |
| 2007/0298798 A1* | 12/2007 | Hagerman et al. .......... 455/436 |
| 2008/0132267 A1* | 6/2008 | Cave et al. .................. 455/522 |

FOREIGN PATENT DOCUMENTS

| | | |
|---|---|---|
| EP | 1 494 371 | 1/2005 |
| WO | WO2005/018114 | 2/2005 |

OTHER PUBLICATIONS

PCT Written Opinion of the International Searching Authority corresponding to PCT Patent Application PCT/US2007/012532 filed Feb. 25, 2007 (6 pages).

* cited by examiner

METHOD AND APPARATUS FOR PATH IMBALANCE REDUCTION IN NETWORKS USING HIGH SPEED DATA PACKET ACCESS (HSDPA)

BACKGROUND OF THE INVENTION

The present invention relates generally to mobile communications and, more particular, to mobile communications systems utilizing high-speed downlink channels.

Traditional mobile telephony services are essentially symmetric in their use of available bandwidth since both the uplink (i.e., transmissions from the user to the base station) and the downlink (i.e., transmissions from the base station to the user) bandwidth requirements are similar. However, as data-oriented mobile services become more prevalent, many such services require significantly more bandwidth for the downlink than the uplink. In order to address this increased downlink requirement for bandwidth, various schemes have been developed. One such scheme, known as High Speed Downlink Packet Access (HSDPA) is an improved downlink packet data scheme for $3^{rd}$ Generation (3G) Partnership Project Organization (3GPP) mobile communication systems, such as the Universal Mobile Terrestrial System (UMTS) system that uses a wideband code division multiple access (WCDMA) air interface. As one skilled in the art will recognize, 3GPP is a standards body for a large number of 3G specifications for current and future mobile communication systems, such as the UMTS and WCDMA standards. As one skilled in the art will further recognize, HSDPA is an upgrade to existing 3G systems that improves capacity and leads to higher data transfer rates as compared to 3G systems that have not been upgraded.

Figure 1:
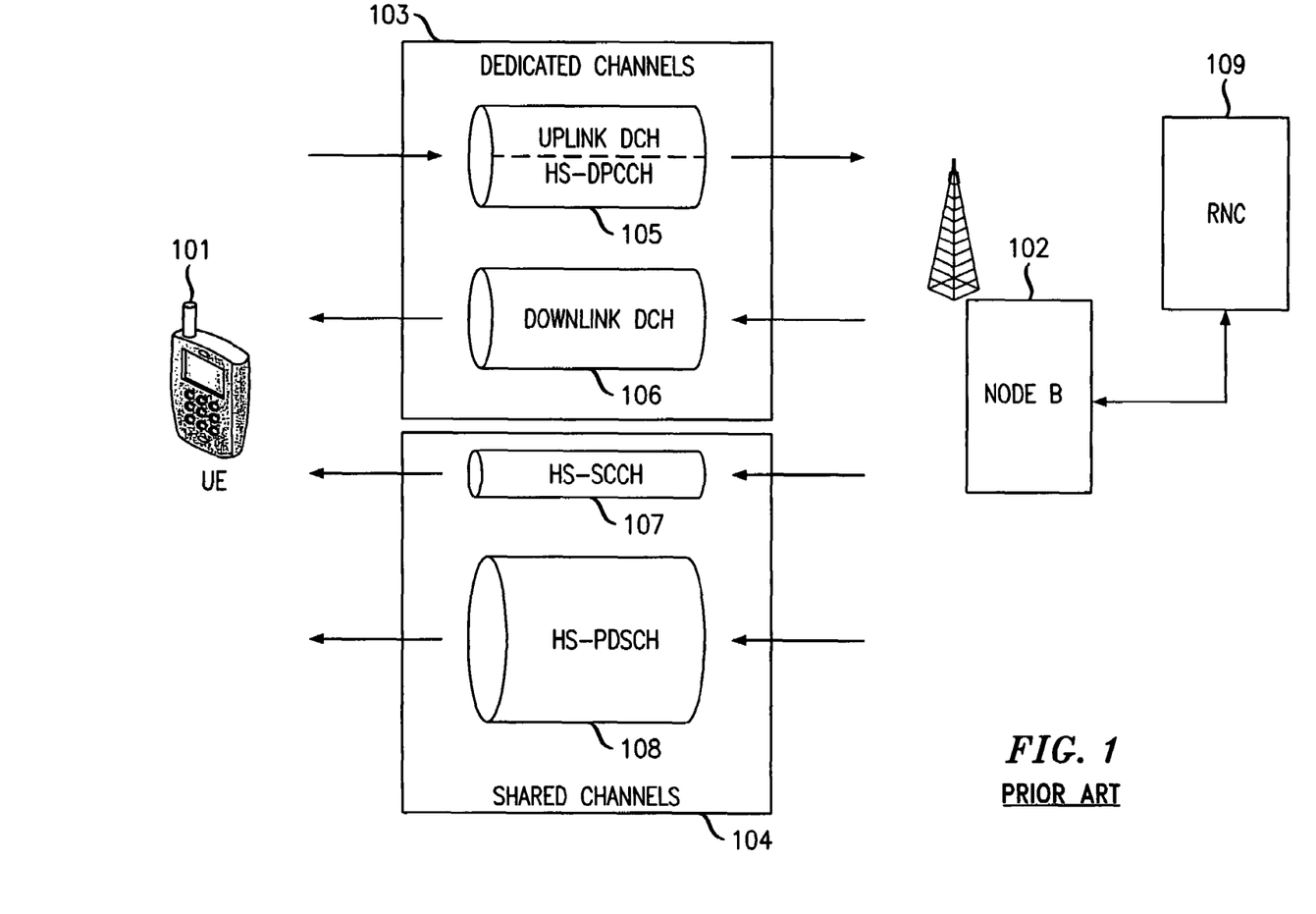
FIG. 1 is a diagram showing HSDPA channels between user equipment (UE) and a Node B.

HSDPA facilitates such transfer rate improvements by providing new shared and dedicated channels for both the downlink and the uplink. FIG. 1 shows these new shared channels 104 and dedicated channels 103 between, for example, a wireless base station 102 (herein referred to as a Node B) and a user device 101 (herein referred to as user equipment (UE)). In particular, a wideband downlink shared channel, referred to in the art and herein as the High Speed Physical Downlink Shared Channel (HS-PDSCH) 108, is a shared channel among all users in a cell and is optimized for very high-speed data transfer. The HS-PDSCH 108 can provide a maximum theoretical downlink speed of up to 14.4 Mb/s, while prior systems were typically limited to a maximum of less than 2 Mb/s. In addition to the HS-PDSCH channel, HSDPA also utilizes a new control channel, referred to herein as the High Speed Shared Control Channel (HS-SCCH) 107. This control channel functions to transmit various control parameters, for example parameters received from RNC 109, from the Node B to the UE. In the uplink direction, HSDPA uses a low bandwidth uplink channel, referred to herein as the High Speed Dedicated Physical Control Channel (HS-DPCCH) 105, for sending data packet acknowledgements/negative-acknowledgements (ACK/NACK) and channel quality information (CQI) from the UE to the Node B. One skilled in the art will recognize that these HSDPA channels can be used to upgrade prior 3G systems and, therefore, other uplink and downlink channels may also provide lower data rate communication, such as the Uplink DCH and Downlink DCH 106 channels shown in FIG. 1. One skilled in the art will also recognize that such HSDPA cells are typically deployed so that, for one specific UE, only one of several cells in a given area is an HSDPA serving cell (i.e., capable of providing HSDPA service). Thus, in typical arrangements, for one specific UE an HSDPA cell will be surrounded by non-HSDPA radio links to other cells.

While HSDPA is, therefore, extremely advantageous, one limitation in prior HSDPA implementations is that the uplink signal from a particular UE must be synchronized with the high speed downlink channel in order for downlink transmissions to be schedule to that UE. However, in some cases interference, for example originating from other users signals from the same or neighboring cells, prevents the uplink CQI and ACK/NACK information from being received from the UE in the HSDPA serving cell and, therefore, prevents downlink transmissions from being scheduled to that UE. As one skilled in the art will recognize, when this information is not received from the UE, synchronization between the UL and DL channels is lost and, as a result, no transmissions will be transmitted from the HSDPA Node B to the UE. This can result in loss of service, loss of the radio link between the UE and Node B or, in some cases, dropped calls. To date, the most popular prior method of reducing this type of interference is to reduce the downlink CPICH power in particular cells in order to balance the uplink and downlink coverage.

SUMMARY OF THE INVENTION

The present inventors have recognized that, while reducing the downlink CPICH power in particular cells is advantageous in reducing downlink interference between cells, it is also disadvantageous in some regards. In particular, the present inventors have recognized that such a reduction in CPICH power may actually increase the loss of synchronization between the uplink and downlink HSDPA channels. More specifically, the present inventors have recognized that such a reduction in the CPICH power effects the soft handover (SHO) algorithms, discussed herein below, in a way such that, even though interference is reduced between cells, a non-HSDPA cell may be selected to dominate the uplink (UL) power control algorithms governing the transmit power of the UE. As a result, the UE transmit power may be reduced below that necessary for reliable reception at an HSDPA serving cell Node B which, therefore, will once again result in loss of synchronization between the UL and downlink (DL) channels.

In accordance with the principles of the present invention, the aforementioned synchronization and potential loss of service problems are essentially solved. In particular, the present inventors have recognized that, by introducing noise into the uplink signal from one or more user devices to a non-HSDPA base station, the apparent quality of the uplink channel in those cells will appear to be lower than the actual quality. Therefore, the power control commands issued from the non-HSDPA base station to a user device will reflect this lower estimated channel quality and, as a result, the user device will follow power control commands from the base station in the HSDPA cell. Accordingly, the UL and DL in the HSDPA cell will remain synchronized.

In accordance with a first embodiment of the present invention, an uplink signal is received at a base station from a user device, a noise signal is generated as a function of a desired power of a downlink channel in a cell and that noise signal is applied to the uplink signal. A first parameter is generated after applying the noise signal to the uplink signal that is representative of the quality of the downlink channel in that cell. In particular, the first parameter may be a quality estimate of the channel. Alternatively, the first parameter may be an estimate of a size of a transport block capable of being transmitted from the base station to the user device.

In accordance with a second embodiment of the present invention, the first parameter is generated at the base station and is transmitted to a radio network controller (RNC) in the network and, in response, power control commands are received from the RNC. These power control commands are then used by the base station to issue commands to the user device to adjust the transmit power of that user device, if necessary.

These and other advantages of the invention will be apparent to those of ordinary skill in the art by reference to the following detailed description and the accompanying drawings.

DETAILED DESCRIPTION OF THE INVENTION

As one skilled in the art will recognize, soft handovers (SHOS) are an important element in a system using the WCDMA air interface, such as the UMTS system. As discussed above, in such a network, each cell transmits a pilot signal on a CPICH channel. These pilot signals are used to distinguish cells in the network from each other, and are each typically transmitted at a constant power. A UE may receive multiple pilot signals depending upon its geographic positioning in relation to different cells. In this case, the received signal to noise ratio of each pilot signal is used by the UE as an indication of the quality of the radio channel between the UE and Node Bs. If the quality of a particular pilot signal corresponding to a Node B is above a specified threshold, the particular cell corresponding to that pilot signal may be added to an Active Set (AS) of cells to which a SHO may be performed.

Based in part on the received UL Signal to Interference Ratio (SIR) from a particular UE, each Node B in the AS transmits Transmit Power Control (TPC) commands to that UE. These TPCs are commands that instruct the UE to adjust its UL transmit power up or down based on the received UL signal characteristics at the Node B. When the UE receives these TPC commands from multiple Node Bs, well-known algorithms (such those algorithms complying with 3GPP specification number 25.214) are used to select the TPC to ensure that the UEs UL power is set optimally. One skilled in the art will recognize that, in determining such an optimal power, such algorithms typically give preference to a Node B that issues a TPC command to lower the UL power. This is desirable in order to reduce interference with neighboring cells.

However, in many systems, the decision to add or drop a cell to the AS for SHO purposes is based on the received DL quality at the UE from the Node B of that cell. Once again, this DL quality is determined largely by the signal to noise ratio of the CPICH of the cell. Thus, due to the differing DL CPICH power levels of different cells, in such a system it is possible that a non-HSDPA cell with a lower CPICH power than the HSDPA serving cell will be added to the AS. In this case, if the non-HSDPA cell DL channel has a better quality than the HSDPA serving cell DL channel, indicated by better path loss characteristics and lower required transmit power, then the non-HSDPA cell will be used to determine the UL power control, as discussed above. Such non-HSDPA cell power control may result in a lower-than-desired UL HS-DPCCH channel power on the HSDPA serving cell and, accordingly, that UL signal will not be received reliably or will become entirely out of synchronization with the HSDPA DL channel.

In one illustrative example, assume a SIR of 6 dB is required for reliable reception on the UL channel from a UE. Further, in this example, assume that at 0 dB UL SIR, synchronization of the UL channel with a DL channel is lost entirely. Also, in this example, a SHO addition occurs when the CPICH of a cell is 2 dB lower in power than the cell having the current lowest power. In an illustrative HSDPA serving cell, the pilot CPICH signal power is 36 dBm, the UL Noise Floor is −100 dBm and the path loss (i.e., the amount of attenuation a signal experiences during over-the-air transmission in both directions) is 100 dB. Thus, accordingly, the UE received CPICH (due to the 100 dB path loss) is −64 dBm. The UE transmit power is set by the HSDPA serving cell at 6 dBm. Assume now that a non-HSDPA cell has a CPICH power of 26 dBm and a UL Noise Floor of −100 dB. If the path loss of the non-HSDPA cell is only 92 dB, then the UE received CPICH will be −66 dBm (i.e., 26 dBm CPICH power −92 dB path loss). Accordingly, the CPICH of the non-HSDPA cell is 2 dB lower than the HSDPA cell and, as a result, the non-HSDPA cell will control the power of the UE UL because, at a path loss of 92 dB, the required UE transmit power is −2 dBm. In such a case, the non-HSDPA cell will instruct the UE to reduce its transmission power to −2 dBm. With the UE transmitting at −2 dBm, the overall UL SIR received at the HSDPA serving cell (with 100 dB path loss, −100 dBm noise floor) is −2 dB. Since this SIR value is below the required 0 dB UL value to maintain synchronization with the HSDPA DL channel, the HSDPA cell will be out of synchronization, resulting in the problems discussed herein above. This is referred to herein as a UL/DL imbalance.

While such non-HSDPA cell power control is one reason why UL/DL imbalances may occur, other factors may also introduce or exacerbate such imbalances. For example, different UL channel noise at different Node Bs, different physical geometries of low noise amplifiers (LNAs) on the tower antennas, and differences between the UL received path and the DL transmit path (e.g., due to different diversity transmit/receive methods, antenna sharing with another antenna, etc.), are all factors that may introduce or increase imbalances between the UL and DL channels in an HSDPA cell.

In accordance with the principles of the present invention, the imbalance between the UL and DL in an HSDPA serving cell is reduced or eliminated by introducing digital noise into the UL signal received at a Node B from a UE in each non-HSDPA cell and, thus, artificially increasing noise into the uplink channel. This, in turn, increases the SIR, as calculated by the corresponding Node B, that is necessary to achieve a reliable signal in the UL channels in the non-HSDPA cells. As is illustrated in the foregoing example, this has the effect of preventing the Node Bs in those non-HSDPA cells from controlling the power of the UE receiving data in a high-speed HSDPA DL channel. Illustratively, the noise added to the UL channel is generated by a digital noise source within the Node B software and is applied by the Node B to the data received from the UE. The decoded UL signal, including various parameters associated with the quality of the signal, is then transmitted to a Radio Network Controller (RNC) for use in performing power control and frame selection functions. One skilled in the art will recognize that an RNC is a well-known component of wireless networks that performs various well-known network functions, such as the aforementioned power control and frame selection functions, across several Node Bs associated with the RNC.

Figure 2:
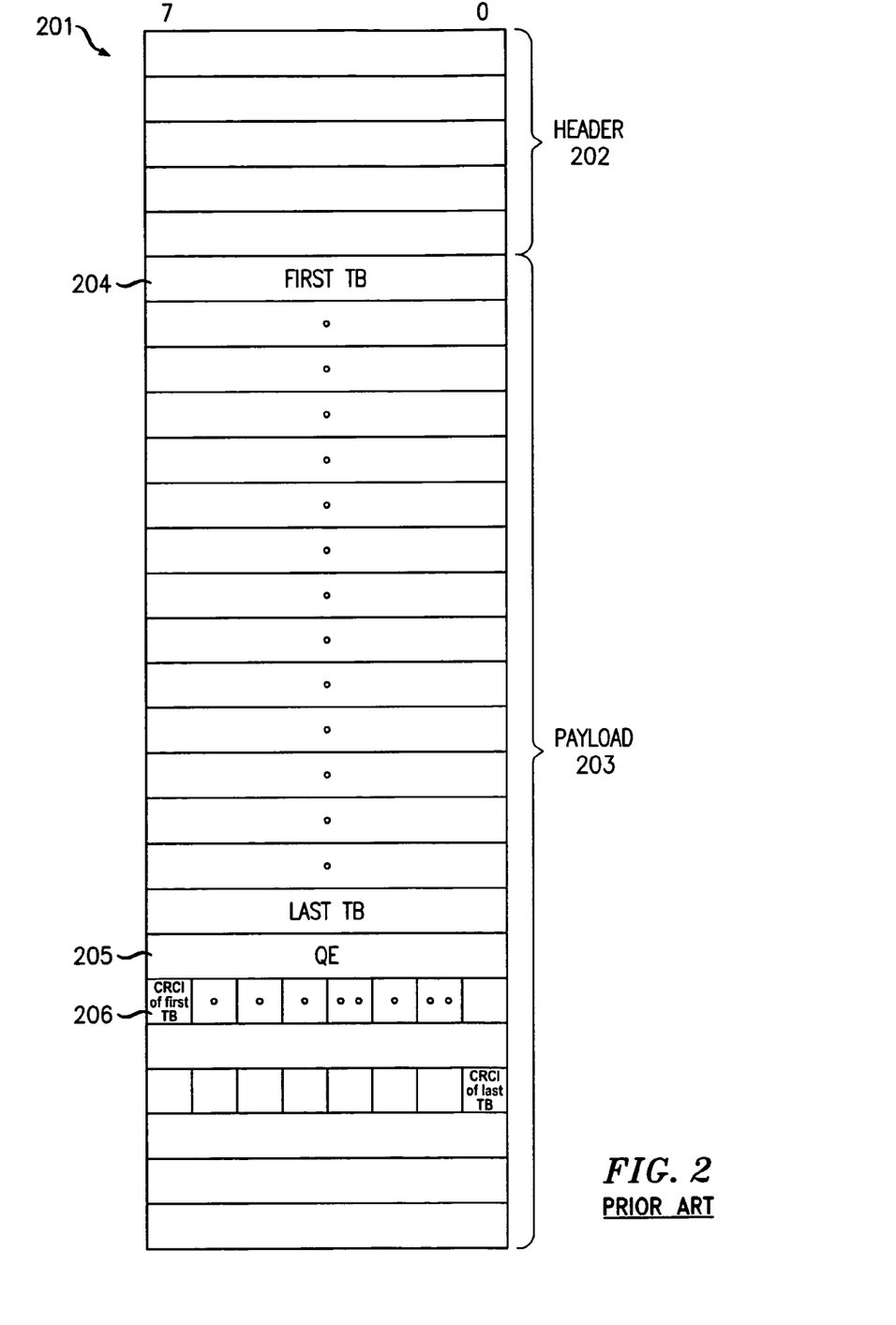
FIG. 2 shows a prior art data frame transmitted from a Node B to a Radio Network Controller (RNC)

FIG. 2 shows an illustrative frame that is transmitted from the Node B to the RNC. Specifically, frame 201 has illustrative header fields 202 and payload fields 203. Such frames are well known in the art and are set forth, for example, in 3GPP specification number 25.427. As such, frame 201 will not be discussed further herein other than as is necessary for the understanding of the principles of the present invention. Frame 201 carries UL data received from the UE in a plurality of transport blocks (TBs) 204. As one skilled in the art will recognize in light of the foregoing, the size of these TBs is determined by the transmission parameters that have been sent to the UE from the RNC. Payload fields 203 of frame 201 also carry cyclic redundancy check information (CRCI) 206 associated with each TB and quality estimates (QE) 205. This information is used to verify the accuracy of the TB information transmitted to the RNC.

Figure 3:
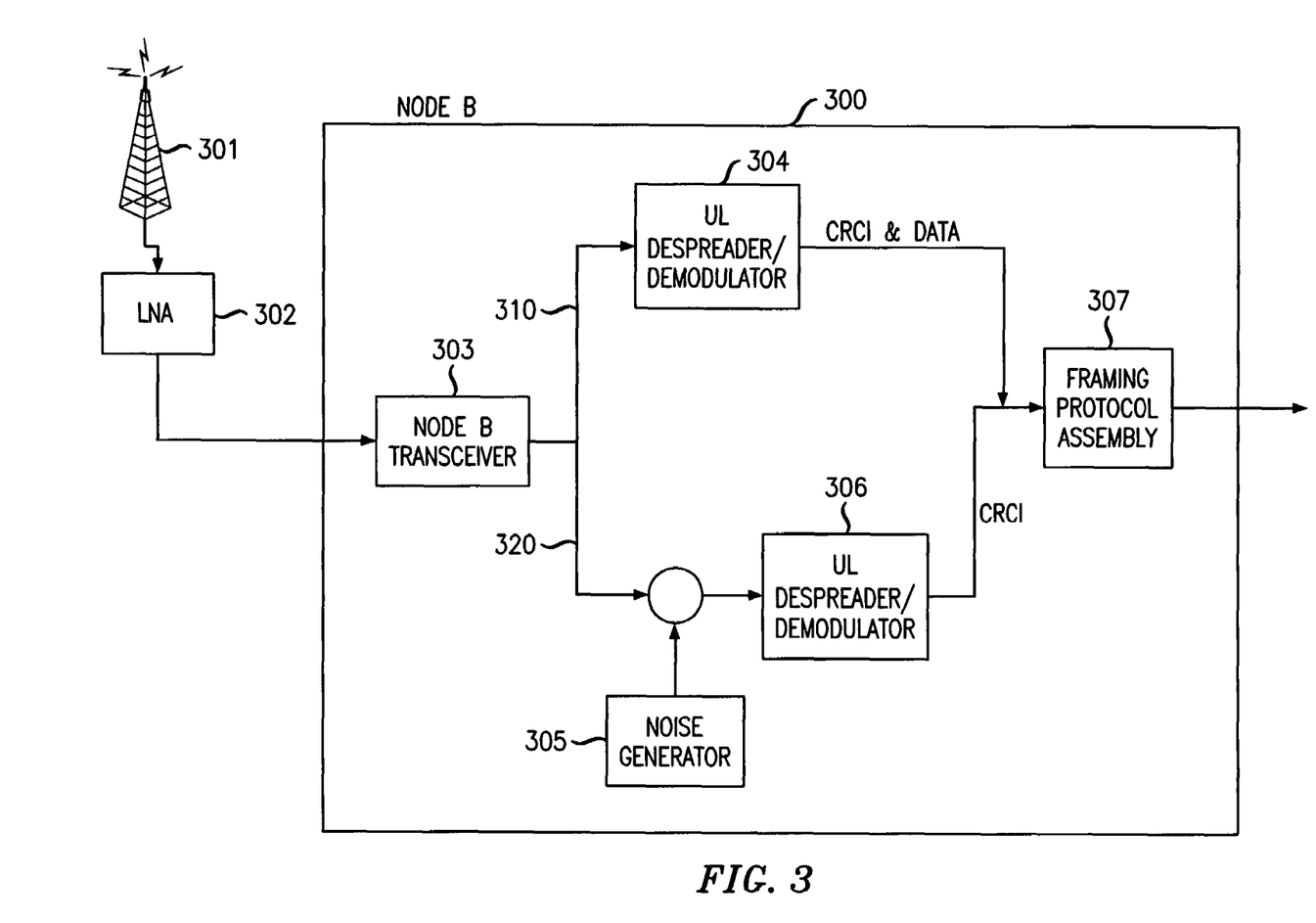
FIG. 3 shows an illustrative Node B in accordance with an embodiment of the present invention.

Thus, if the noise in a UL channel is increased by adding noise to the UL signal, as discussed above, the value of the CRCI and QE associated with the TBs in the data frame will change. Thus, when the UL signal is decoded, the CRCI and QE information will reflect an increased noise. FIG. 3 shows an illustrative Node B 300 in which frames, such as frame 201 in FIG. 2, are created for transmission to an appropriate RNC by inserting digital noise into the UL signal received from the UE. Referring to FIG. 3, when an UL signal is received at antenna 301 from a UE, that signal contains channel quality information, which is indicative of the TB size, modulation type and number of parallel codes that could be received correctly in the DL channel. This signal is, for example, amplified by LNA 302 and passed to the Node B transceiver 303. In accordance with the principles of the present invention, the transceiver 303 then splits the signal into two identical signals and sends one of these split signals to UL Despreader/Demodulator 304 along path 310 where the signal, herein after referred to as the clean signal, is decoded and demodulated. The Node B 300 then generates corresponding CRCIs and Quality Estimates (QEs) associated with that channel. When the Node B contains the HSDPA serving cell, the Node B uses the received uplink information to adjust TB size, modulation type and the number of parallel codes for the downlink transmission, accordingly. The Node B also sends the other split signal from the Node B transceiver 303 along path 320 to UL Despreader/Demodulator 306. However, prior to reaching UL Despreader/Demodulator 306, a predetermined amount of noise is generated by noise generator 305 and inserted into the signal, herein after referred to as the noise-added signal. This noise can be generated by a pure physical noise generator as used e.g. in measurement equipment or by digitally generated noise signals e.g. in digital signal processor (DSP). Accordingly, the resulting decoded and demodulated signal noise-added signal will contain more noise and, as a result, the Node B 300 will calculate different CRCIs and QEs on this path.

Figure 4:
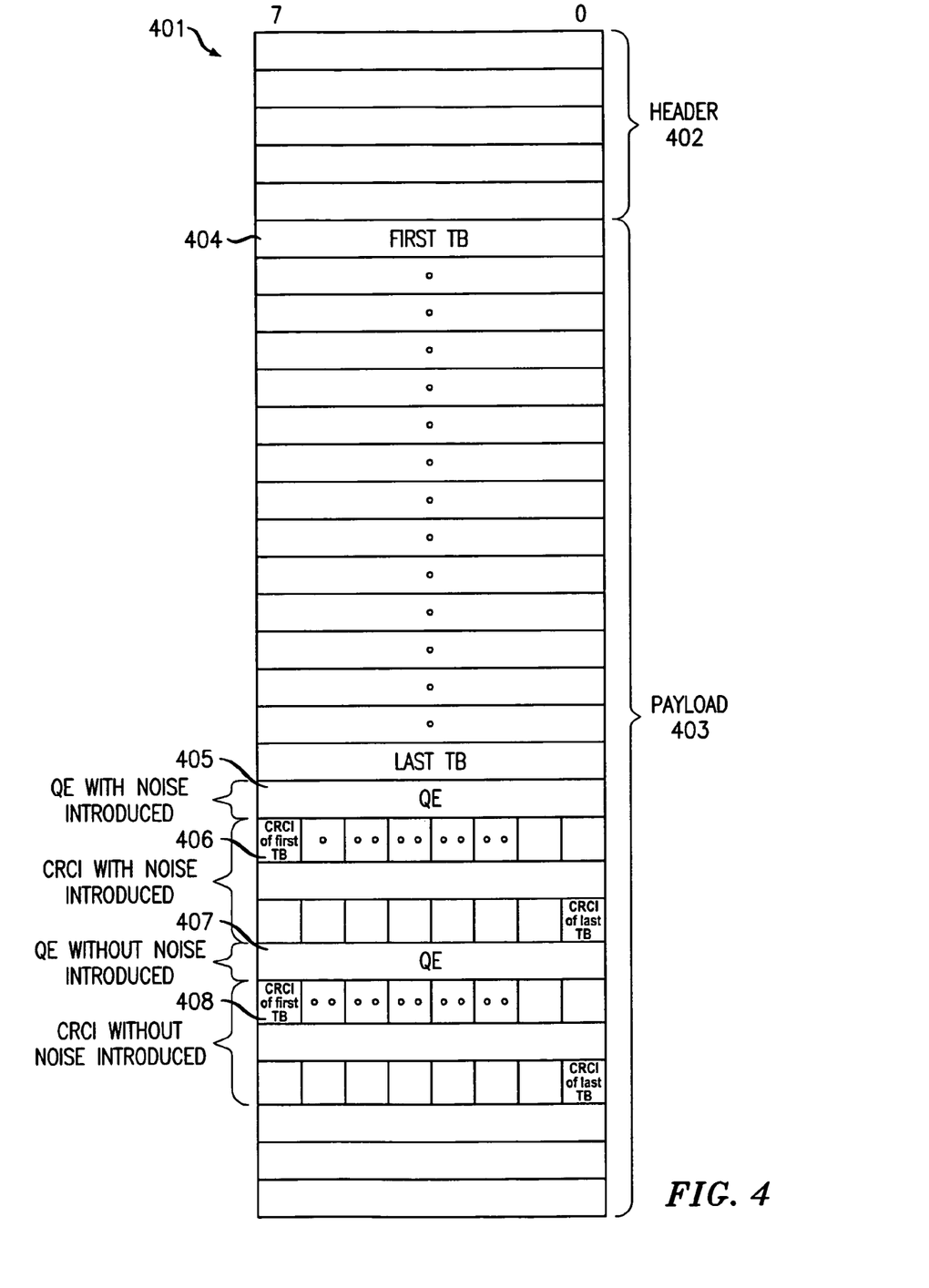
FIG. 4 shows an illustrative data frame transmitted from the Node B of FIG. 3 to an RNC in accordance with an embodiment of the invention.

Once the above parameters (CRCIs, QEs, etc) have been calculated by Node B 300 for both the clean and noise-added UL signals, that information is transmitted to framing protocol assembly function 307. Function 307 then creates one or more frames containing this information for transmission to the RNC. Such a frame is shown illustratively in FIG. 4. Referring to that figure, similar to the frame of FIG. 2, frame 401 in FIG. 4 has header portion 402 and payload portion 403. Once again, payload portion 403 contains TBs 404. However, the payload portion 403 now includes fields for QE information 405 and CRCI information 406 generated with noise introduced, as discussed above, as well as fields for QE information 407 and CRCI information 408 information without noise. Once this frame is generated Node B 300 of FIG. 3 transmits the frame to the RNC.

Figure 5:
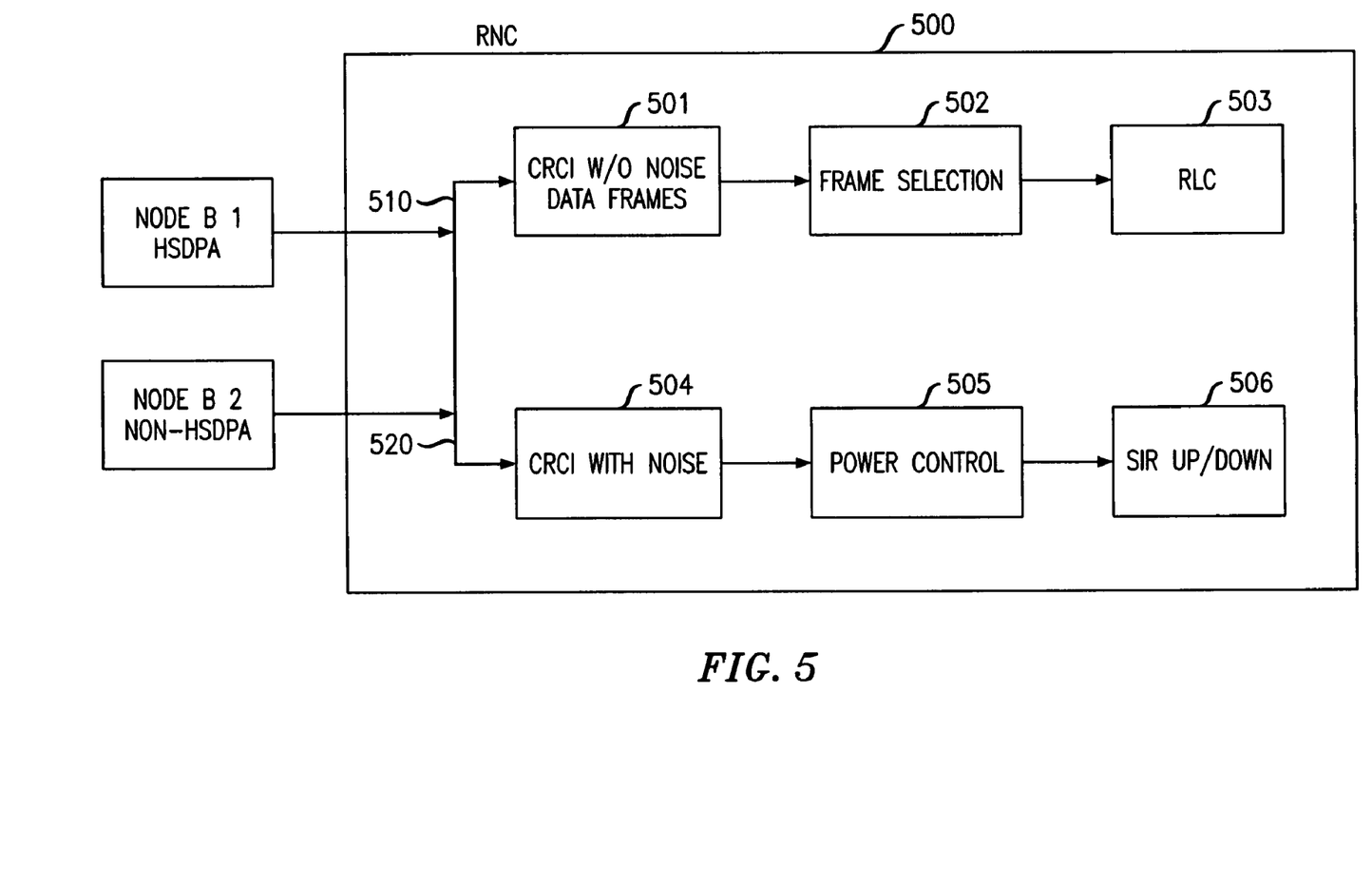
FIG. 5 shows an illustrative RNC in accordance with an embodiment of the present invention.

FIG. 5 shows an illustrative RNC in accordance with an embodiment of the present invention. Referring to that figure, RNC 500 receives the frames, discussed above, from both HSDPA and non-HSDPA cells. Once again, these frames contain both CRCI and QE information in the presence of Node B-added noise, as well as such information without such noise. The RNC may use, for example, the information CRCI and QE information generated without such noise to perform functions not related to power control. For example, this information is used along path 510 by the UL frame selector 502 which, as one skilled in the art will recognize, determines which UL frame is selected for transmission and which UL frames are discarded. Once the frames have been selected, the Radio Link Controller (RLC) 503 performs any necessary error recovery at the link layer. As one skilled in the art will also recognize, using CRCI and QE information generated in the presence of artificial noise for these frame selection and error recovery purposes could undesirably distort the effectiveness of these functions as this does not reflect the actual quality of the received data.

The RNC 500 uses the CRC and QE information generated by adding noise by processing that information along path 520 in FIG. 5 to issue UL SIR power control guidance to the Node Bs. In particular, based on the CRCI values and on the QE information in the frame, the RNC modifies the SIR target used by the UL by including the absolute value of the new SIR target in a power control frame generated by power control and SIR up/down functions 505 and 506 in FIG. 5 and sent to the Node B's. Then, by comparing this SIR target with the received UL SIR from a particular UE, each Node B in the AS can transmit TPC commands to that UE.

In accordance with an embodiment of the present invention, the example of the SHO process, discussed above, can be updated to reflect how the insertion of noise in the UL signal at the Node B can prevent UL/DL imbalance problems. In particular, once again assume a SIR of 6 dB is required for reliable reception on the UL channel from a UE. Further, in this example, at 0 dB UL power, synchronization of the UL channel with a DL channel is lost entirely. Also, in this example, a SHO addition occurs when the CPICH of a cell is 2 dB lower in power than the cell having the current lowest power. In an illustrative HSDPA serving cell, the pilot CPICH signal power is 36 dBm, the UL Noise Floor is −100 dBm and the path loss is 100 dB. Thus, accordingly, the UE received CPICH (due to the 100 dB path loss) is −64 dBm. The UE transmit power is set by the HSDPA serving cell at 6 dBm. Assume now that a non-HSDPA cell has a CPICH power of 26 dBm and a UL Noise Floor of −100 dBm. In addition, assume that the Node B noise generator 305 of FIG. 3 inserts 10 dB of noise floor rise into the signal prior to decoding/demodulation. If the path loss of the non-HSDPA cell is only 92 dB, then the UE received CPICH will be −66 dBm (i.e., 26 dBm CPICH power −92 dB path loss). However, in this example, the required UE transmit power would be 8 dBm (−100 dBm Noise Floor +10 dB from noise generator +92 dB path loss +6 dB required UL SIR). Accordingly, the HSDPA required transmit power is lower than the non-HSDPA cell and, as a result, the HSDPA cell will control the power of the UE UL (since preference is generally given to commands for lower power levels). Thus, the HSDPA UL will remain in synchronization with the HSDPA DL.

One skilled in the art will recognize in light of the foregoing that variations on the procedures described above may be implemented. For example, one skilled in the art will recognize that the algorithm for determining SIR up/down commands at the RNC may be applied without decoding the signal in the absence of noise, i.e. as would be the case without path 310 in the Node B of FIG. 3 and without path 510 in the RNC, respectively. Additionally, the noise generation and effect on the CRCI values may be estimated rather than actually applied by noise generator 305. In this case, no noise generator would be necessary at the expense of somewhat more intensive computations. Also, the UL target noise level at each Node B could be set more directly as a function of the detected imbalance to the CPICH power level in an HSDPA cell for example relative to the CPICH of other Node Bs in the way that, in a simple realization, the injected noise level is proportional to the CPICH power difference between the HSDPA cell and the non-HSDPA cell. As one skilled in the art will recognize, this is the automatic realization of the example as mentioned above, where the 10 dB of additional noise is simply given by the difference between CPICH power of the HSDPA cell (+36 dBm) and the CPICH power of the non-HSDPA cell (+26 dBm). In addition, one skilled in the art will recognize that the foregoing methods may be applied only to certain radio links and not to all radio links with equally advantageous results. Finally, due to the potential for increased computational complexity of the foregoing algorithm, it may optionally only be used when a Node B is not at maximum capacity. Other variations will also be obvious to one skilled in the art in light of the foregoing description.

Figure 6:
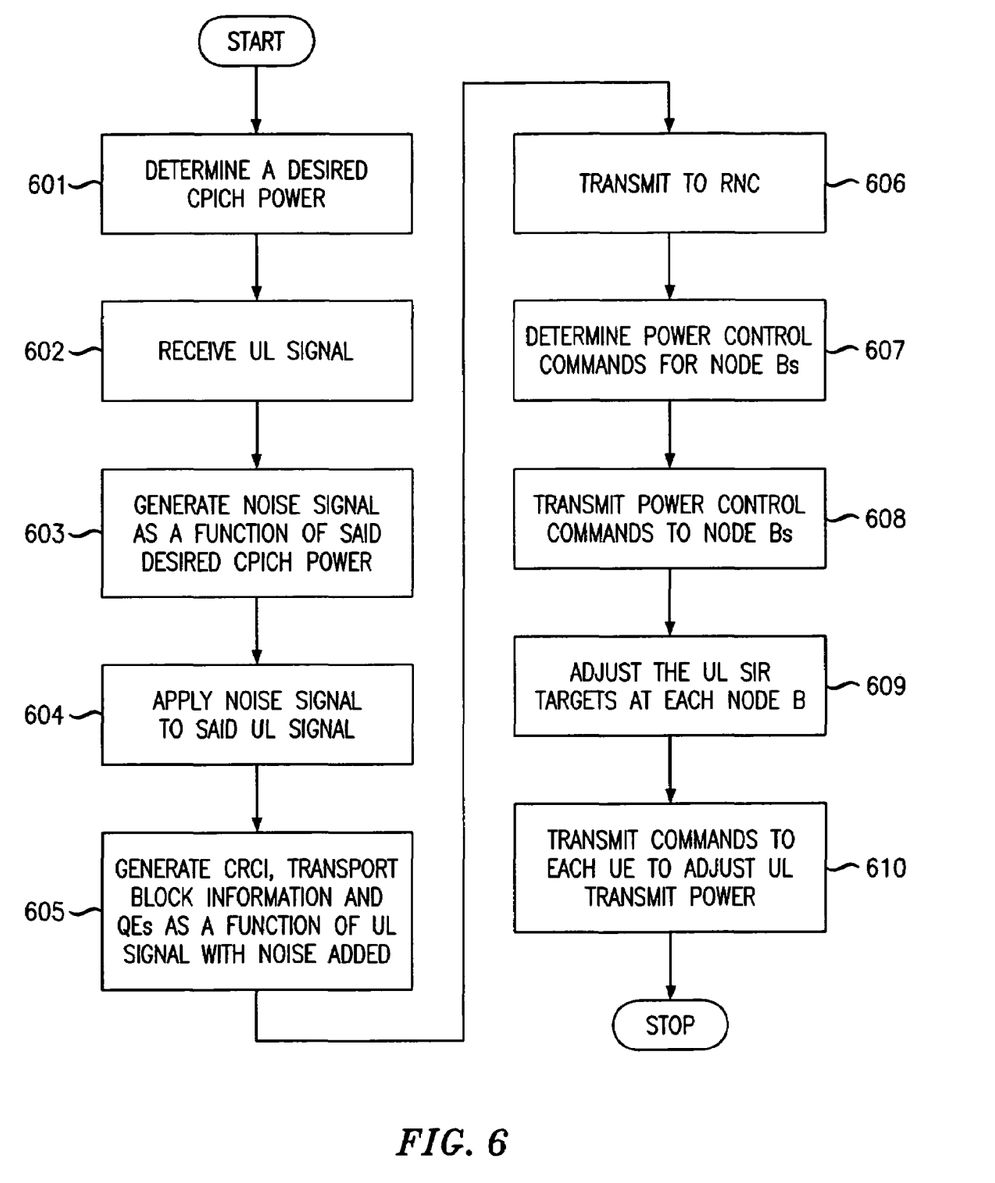
FIG. 6 shows an illustrative method in accordance with an embodiment of the invention.

FIG. 6 shows the steps of a method of the operations of an illustrative Node B and illustrative RNC in accordance with an embodiment of the present invention. First, at step 601, a desired CPICH power level is determined in one or more channels. As discussed herein above, this CPICH power level should be set at a level that reduces DL interference with other cells but, at the same time, provides adequate DL quality. Next, at step 602, an UL signal is received by a Node B from a UE. Then, at step 603, noise is generated within the Node B as a function of the desired CPICH power level. At step 604, that noise is applied to the UL signal and, at step 605, CRCI and QEs are generated as a function of the UL signal with noise added. Frames are generated containing this information and, at step 606, those frames are transmitted to the RNC. Then, at step 607, power control commands are determined by the RNC for one or more Node Bs and, at step 608, those commands are transmitted to the respective Node Bs. Finally, at step 609, the UL SIR targets are adjusted in response to the power control commands and, at step 610, commands are transmitted to the UE to adjust the UL transmit power in accordance with those SIR targets.

Figure 7:
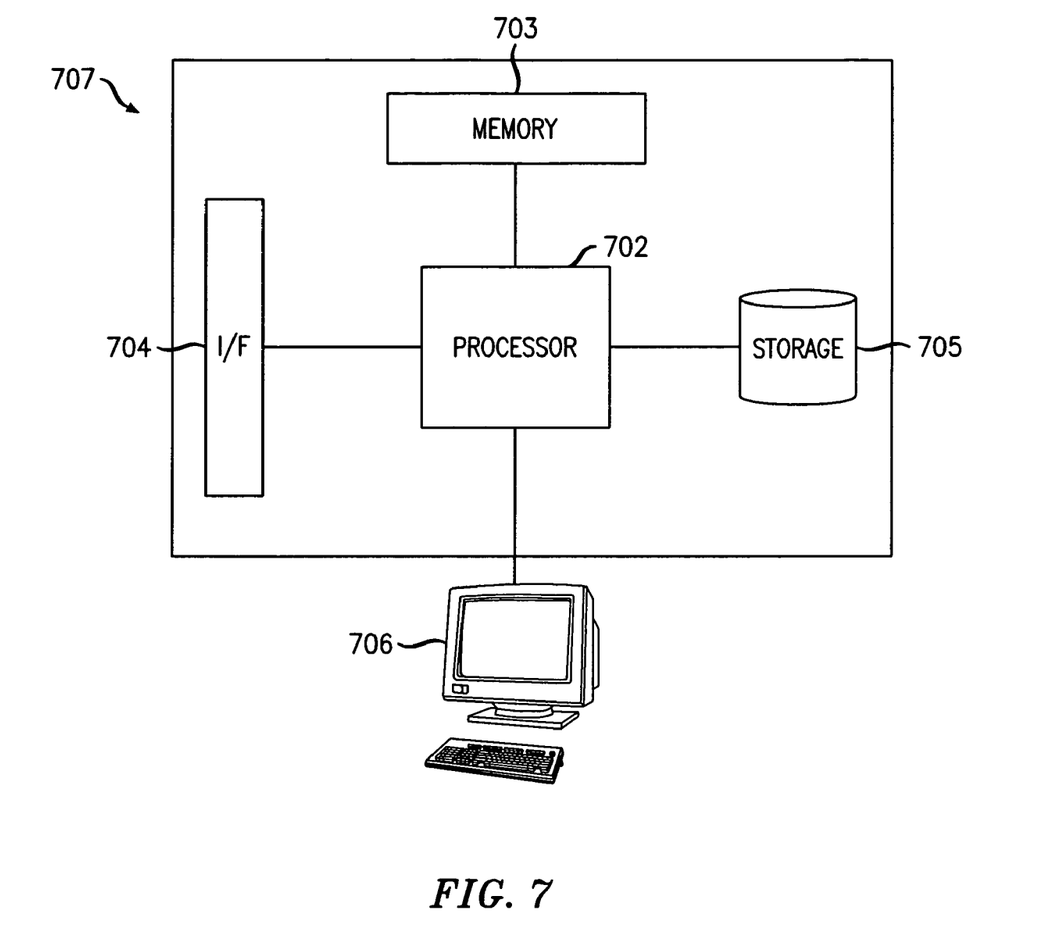
FIG. 7 shows a block diagram of a computer adapted for use in accordance with an embodiment of the invention.

FIG. 7 shows a block diagram of an illustrative system adapted to perform the steps of an algorithm used at a Node B to add noise to an UL signal from a UE and/or to perform power control calculations at the Node B or RNC in order to reduce UL/DL channel imbalances, as discussed above. Referring to FIG. 7, computer 707 may be implemented on any suitable computer adapted to receive, store and transmit data such as data associated with the aforementioned power control and noise information. Illustrative system 707 may have, for example, a processor 702 (or multiple processors) which controls the overall operation of the system 707. Such operation is defined by computer program instructions stored in a memory 703 and executed by processor 702. The memory 703 may be any type of computer readable medium, including without limitation electronic, magnetic, or optical media. Further, while one memory unit 703 is shown in FIG. 7, it is to be understood that memory unit 703 could comprise multiple memory units, with such memory units comprising any type of memory. System 707 also comprises illustrative network interface 704 for use in, among other functions, receiving channel quality information and noise parameters. System 707 also illustratively comprises a storage medium, such as a computer hard disk drive 705 for storing, for example, data and computer programs adapted for use in accordance with the principles of the present invention as described hereinabove. One skilled in the art will recognize that flash memory may preferably be used in some implementations in place of hard disk drive 705. Finally, system 707 may also have illustrative terminal 706 having, illustratively, keyboard 708 and monitor 709 for inputting information and displaying results of the foregoing calculations. One skilled in the art will recognize that system 707 is merely illustrative in nature and that various hardware and software components may be adapted for equally advantageous use in a computer in accordance with the principles of the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for use in a wireless cellular network comprising:
  receiving at a base station in a cell in said network a first uplink signal from a user device via an uplink channel;
  generating a noise signal as a function of a desired power of a downlink channel in said cell; and
  applying said noise signal to said first uplink signal to create a second uplink signal.

2. The method of claim 1 further comprising:
  decoding said first uplink signal to create a decoded first uplink signal; and
  transmitting said decoded first uplink signal to a radio network controller associated with said base station.

3. The method of claim 2 further comprising:
  generating at least one parameter representing a quality of a channel in said cell.

4. The method of claim 3 wherein said step of generating at least one parameter comprises:
  generating a first value of a parameter as a function of said first uplink signal; and
  generating a second value of said parameter as a function of said second uplink signal.

5. The method of claim 4 further comprising:
  transmitting said first value of said parameter and said second value of said parameter to a radio network controller.

6. The method of claim 3 wherein said at least one parameter comprises a value representing cyclic redundancy check information associated with a transport block.

7. The method of claim 3 wherein said at least one parameter comprises a quality estimate of a channel in said cell.

8. The method of claim 3 wherein said channel comprises said downlink channel.

9. The method of claim 3 further comprising:
receiving from said radio network controller an indication of a desired change to a power level of said first uplink channel, said indication a function of said at least one parameter.

10. The method of claim 9 further comprising:
transmitting to said user device a command to adjust a transmit power of said user device, said transmit power a function of said indication.

11. An apparatus for use in a wireless cellular network comprising:
means for receiving at a base station in a cell in said network a first uplink signal from a user device via an uplink channel;
means for generating a noise signal as a function of a desired power of a downlink channel in said cell; and
means for applying said noise signal to said first uplink signal to create a second uplink signal.

12. The apparatus of claim 11 further comprising:
means for decoding said first uplink signal to create a decoded first uplink signal; and
means for transmitting said decoded first uplink signal to a radio network controller associated with said base station.

13. The apparatus of claim 12 further comprising:
means for generating at least one parameter representing a quality of a channel in said cell.

14. The apparatus of claim 13 wherein said step of generating at least one parameter comprises:
means for generating a first value of a parameter as a function of said first uplink signal; and
means for generating a second value of said parameter as a function of said second uplink signal.

15. The apparatus of claim 14 further comprising:
means for transmitting said first value of said parameter and said second value of said parameter to a radio network controller.

16. The apparatus of claim 13 wherein said at least one parameter comprises a value representing cyclic redundancy check information associated with a transport block.

17. The apparatus of claim 13 wherein said at least one parameter comprises a quality estimate of a channel in said cell.

18. The apparatus of claim 13 wherein said channel comprises said downlink channel.

19. The apparatus of claim 13 further comprising:
means for receiving from said radio network controller an indication of a desired change to a power level of said first uplink channel, said indication a function of said at least one parameter.

20. The apparatus of claim 19 further comprising:
means for transmitting to said user device a command to adjust a transmit power of said user device, said transmit power a function of said indication.

21. A computer readable medium comprising computer program instructions which, when executed by a processor, define the steps for providing service in a wireless cellular network, said steps comprising:
receiving at a base station in a cell in said network a first uplink signal from a user device via an uplink channel;
generating a noise signal as a function of a desired power of a downlink channel in said cell; and
applying said noise signal to said first uplink signal to create a second uplink signal.

22. The computer readable medium of claim 21 further comprising computer program instructions which, when executed by a processor, define the steps of:
decoding said first uplink signal to create a decoded first uplink signal; and
transmitting said decoded first uplink signal to a radio network controller associated with said base station.

23. The computer readable medium of claim 22 further comprising computer program instructions which, when executed by a processor, define the step of:
generating at least one parameter representing a quality of a channel in said cell.

24. The computer readable medium of claim 23 wherein said step of generating at least one parameter comprises:
generating a first value of a parameter as a function of said first uplink signal; and
generating a second value of said parameter as a function of said second uplink signal.

25. The computer readable medium of claim 24 further comprising computer program instructions which, when executed by a processor, define the step of:
transmitting said first value of said parameter and said second value of said parameter to a radio network controller.

26. The computer readable medium of claim 23 wherein said at least one parameter comprises a value representing cyclic redundancy check information associated with a transport block.

27. The computer readable medium of claim 23 wherein said at least one parameter comprises a quality estimate of a channel in said cell.

28. The computer readable medium of claim 23 wherein said channel comprises said downlink channel.

29. The computer readable medium of claim 23 further comprising computer program instructions which, when executed by a processor, define the step of:
receiving from said radio network controller an indication of a desired change to a power level of said first uplink channel, said indication a function of said at least one parameter.

30. The computer readable medium of claim 29 further comprising computer program instructions which, when executed by a processor, define the step of:
transmitting to said user device a command to adjust a transmit power of said user device, said transmit power a function of said indication.

* * * * *

UNITED STATES PATENT AND TRADEMARK OFFICE
CERTIFICATE OF CORRECTION

PATENT NO. : 7,613,476 B2
APPLICATION NO. : 11/446084
DATED : November 3, 2009
INVENTOR(S) : Charriere et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 733 days.

Signed and Sealed this

Nineteenth Day of October, 2010

David J. Kappos
*Director of the United States Patent and Trademark Office*